Dec. 16, 1941.  J. TAX  2,266,286
DECOY
Filed July 28, 1939   2 Sheets-Sheet 1
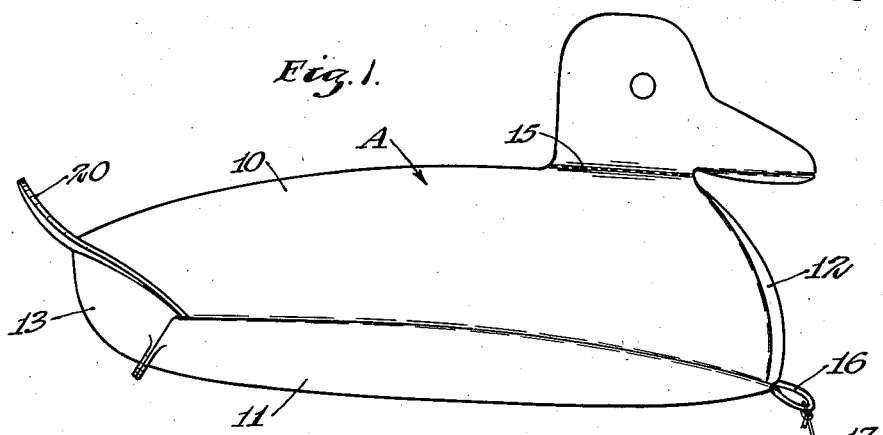
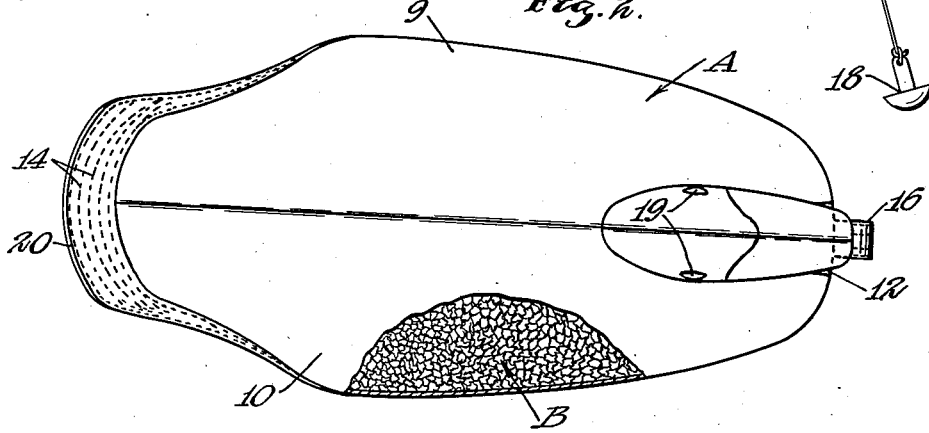
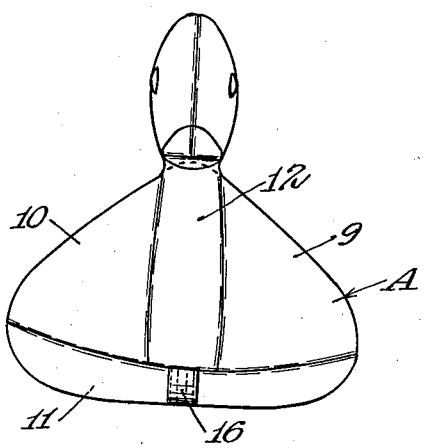
INVENTOR.
JOHN TAX.
BY HIS ATTORNEYS.
Williamson & Williamson Dec. 16, 1941.  J. TAX  2,266,286
DECOY
Filed July 28, 1939  2 Sheets-Sheet 2
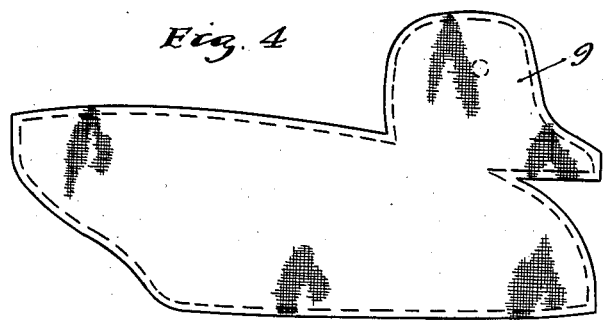
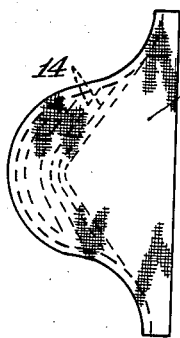
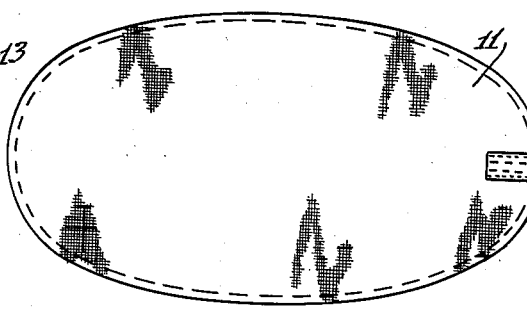
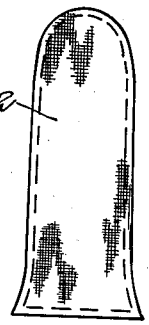
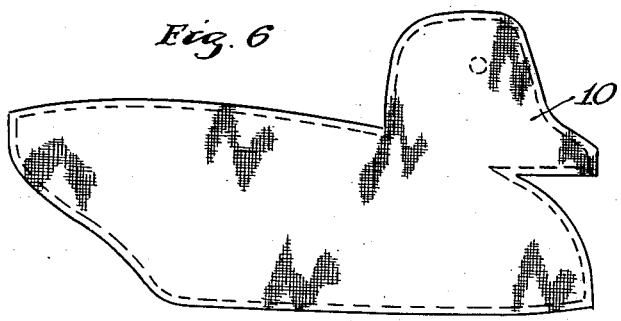
INVENTOR.
JOHN TAX.
BY HIS ATTORNEYS.
Williamson & Williamson Patented Dec. 16, 1941

2,266,286

UNITED STATES PATENT OFFICE 2,266,286

DECOY

John Tax, Osakis, Minn.

Application July 28, 1939, Serial No. 287,025

1 Claim. (Cl. 43—3)

This invention relates to decoys and particularly to water bird decoys such as duck and goose decoys.

It is the general object of this invention to provide a novel and improved light weight water bird decoy of cheap and simple construction, which is life-like in appearance, easy to handle and carry, will ride the waves in an animated, natural manner, is waterproof and practically indestructible.

A more specific object of the invention is to provide a light weight water bird decoy including a fabric skin stuffed with ground cork, or analogous buoyant material, and the body of which is of substantially isosceles triangular shape in transverse cross section, so that the decoy will not readily tip over onto its side or back under wave or wind action.

Another object is to provide such a decoy having a rear vane which is up-tipped to represent the tail feathers of the bird and will catch the wind to give the decoy animation when afloat.

Yet another object is to provide a skin for a light weight decoy which can be stuffed with buoyant material, such as ground cork, and which is composed of but five pieces of fabric secured together by stitching.

The objects and advantages of the invention will more fully appear from the following description made in connection with the accompanying drawings wherein like reference characters refer to the same or similar parts throughout the various views and in which, Fig. 1 is a view in side elevation illustrating a duck decoy embodying the invention, the coloring of the decoy not being shown;

Fig. 2 is a plan view of the same decoy, a portion of the body of the same being broken away to illustrate the internal filling;

Fig. 3 is a view in front elevation of the same decoy;

Fig. 4 is a view illustrating one of the fabric side sections forming part of the skin of the decoy;

Fig. 5 is a view illustrating the fabric bottom section forming part of the skin of the decoy;

Fig. 6 is a view illustrating another of the fabric side sections forming part of the skin of the decoy;

Fig. 7 is a view illustrating the fabric front section forming part of the skin of the decoy; and Fig. 8 is a view illustrating the fabric rear section forming part of the skin of the decoy.

Referring to the drawings there is illustrated a blue bill duck decoy embodying the invention. In accordance with the invention the decoy comprises an outer skin or covering designated as an entirety by the letter A and a light weight filler B preferably of ground cork, or similar light weight buoyant material, which completely fills the skin or casing A.

As best illustrated in Figs. 4, 5, 7 and 8, the skin A is composed of five pieces of fabric, such as canvas, the side sections of the skin being designated 9 and 10 respectively, the bottom section being designated 11, the front section being designated 12 and the rear section being designated 13. The two side sections 9 and 10 are cut to correspond roughly in shape to the side profile of the bird being represented by the decoy, the pattern, however, being slightly larger than the bird. The bottom section 11 is of substantially oval shape; the front section 12 is of finger shape; and the rear section 13 is of a shape corresponding to that of an ordinary mantel clock i. e. it has a substantially straight lower edge, the two ends of which project upwardly at right angles to the lower edge and the two ends are joined by volute curves which form a central mound shape of rounded contour. Accordingly, the rear skin section 13 may be referred to as of mantel clock shape.

In the drawings, Figs. 4 to 8, stitching is represented by dash lines. In connecting together the various sections 9, 10, 11, 12 and 13 forming the skin A of the decoy the two side sections 9 and 10 are stitched together by internal stitching which runs from the front of the bill portions of the two sections upwardly around the head portions and then rearwardly along the back portions to the rear upper tips of these back portions. The front section 12 of the skin forms the lower part of the bill portion of the skin and the central portion of the breast of the skin and accordingly the front section 12 is secured by internal stitching along its upper curved portion to the lower bill edges of the side sections 9 and 10, and the lower portions of the front section 12 are secured by internal stitching to the breast edges of the side sections 9 and 10, the straight lower edge of the finger-like front section 12 substantially aligning with the lower edges of the two side sections 9 and 10. The rear section 13 is secured by external stitching to the rear edges of the side sections 9 and 10, and several lines of stitching designated by the numeral 14 are employed for this purpose and to produce an up-tipped vane 20 at the rear of the skin representing the tail feathers of the bird and acting somewhat in the manner of a small sail to catch the wind when the decoy is afloat and produce life-like motion of the decoy. The bottom section 11 is secured along its edges by internal stitching to the front section 12 and the two side sections 9 and 10 and is secured by external stitching to the lower edge of the rear section 13.

In making up the decoy the skin A is produced by securing all the sections 9, 10, 11, 12 and 13 together as described with the exception that at the bottom rear part of the decoy, the lower edge of the rear section 13 is not at once stitched to the rear portion of the bottom section 11. The skin is filled with the ground cork B through the opening thus left in the skin of the decoy and the head is packed tightly with the ground cork and the two side sections 9 and 10 are secured together by a line of stitching 15 which runs across the neck of the decoy to maintain the proper shape of the head of the decoy. The body of the decoy having been packed is closed up by the external stitching at the rear bottom part of the decoy running between the lower edge of the rear section 13 and the rear portion of the bottom section 11.

It should be stated that as the lower edge of the front section 12 is secured to the front portion of the bottom section 11, a loop 16 of fabric is attached to these portions to produce a convenient attachment for an anchor string 17 to the lower end of which an anchor 18 is secured.

It will, of course, be understood that the ground cork B tightly fills out the skin A so that the decoy has the general shape and appearance of the water fowl which it represents. Headed pins 19 are inserted in the head of the decoy to form eyes for the decoy.

After the decoy has been prepared as aforesaid it is painted with two prime coats consisting preferably of a mixture of four pints white lead, one pint turpentine, one-third part spar varnish, and one gill of japan. These prime coats may be applied by dipping, or may be applied by brush. Over the two prime coats one or two coats of good lead paint are applied, the paint used being what is known as ordinary outside paint. Of course, the decoy is colored to represent the coloring of the particular duck that it is to represent. For example, if the decoy is to be used as a blue bill decoy the bill will be colored slate, the head and breast will be colored black, the belly will be colored white, the back will be colored black with white diagonal lines showing through, and the tail will be colored black. Other colors of course will be used for decoys representing other birds. No attempt is made in the present drawings to represent coloring for any particular decoy.

By reason of the pattern employed for the skin of the decoy and the manner in which the skin is stuffed, the body of the decoy in transverse cross section, as best shown in Fig. 3, will be of substantially the same shape as a base down isosceles triangle. Accordingly the decoy will present a wide, comparatively smooth, straight bottom surface and will not readily tip over onto its side or back when afloat under the action of wind and waves. As the anchor connection to the decoy is at the front lower end of the decoy, the whole decoy can readily swing at its anchorage under the action of wind and waves to produce life-like action. The vane 20 catches the wind in the manner of a sail, so as to cause the decoy to dip, swing, raise and move about in much the same manner as does a duck or other water fowl while paddling about and feeding.

The paint coats water-proof the skin of the decoy and, of course, the ground cork filler B makes the decoy highly buoyant and light weight. It is thus very easy to carry and handle a number of the decoys and the main disadvantages of the ordinary wooden decoy are overcome. The blue bill decoy weighs slightly over three-fourths of a pound so that a dozen of these decoys will only weigh approximately nine pounds. The mallard decoy, which will be somewhat larger than the blue bill decoy, will, of course, weigh somewhat more per dozen and, of course, goose decoys will be proportionately heavier.

It will be seen that an extremely simple and efficient decoy has been provided which will have a life-like action and will carry out all the objects set forth.

It will, of course, be understood that variations may be made in the form, details, arrangement and proportions of the various parts without departing from the scope of the present invention which, generally stated, consists in the matter shown and described and set forth in the appended claim.

What is claimed is:

A light weight water bird decoy comprising a painted fabric skin, comprising but five fabric sections assembled together by stitching and shaped to represent a water bird and light weight buoyant material filling the skin, the said skin sections comprising an oval shaped bottom section, two side sections shaped to represent in side silhouette the bird represented by the decoy, a rear mantel clock shaped section and a front finger shaped section, the two side sections being stitched together at their upper edges from the bill of the decoy to the tail thereof, said front finger shaped section being secured to the lower bill edges and the breast edges of the two side sections, said rear section being secured at its upper and side edges to the rear tail edges of the side sections and said bottom oval shaped section being secured at its edges at its front to the lower edge of the finger shaped section and being secured at its sides to the lower edges of the side sections and being secured at its rear to the lower edge of the rear section.

JOHN TAX.